US012659889B2

(12) United States Patent
Huang

(10) Patent No.: US 12,659,889 B2
(45) Date of Patent: Jun. 16, 2026

(54) CONTROL METHOD OF WIRELESS COMMUNICATION MODULE FOR PPDU END TIME ALIGNMENT

(71) Applicant: MEDIATEK INC., Hsin-Chu (TW)

(72) Inventor: Chi-Han Huang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 252 days.

(21) Appl. No.: 18/376,846

(22) Filed: Oct. 5, 2023

(65) Prior Publication Data

US 2024/0163814 A1 May 16, 2024

Related U.S. Application Data

(60) Provisional application No. 63/383,110, filed on Nov. 10, 2022.

(51) Int. Cl.
*H04W 56/00* (2009.01)

(52) U.S. Cl.
CPC .............................. *H04W 56/0005* (2013.01)

(58) Field of Classification Search
CPC ....... H04W 56/0005; H04L 2001/0096; H04L 1/0008
USPC ......................................................... 370/350
See application file for complete search history.

(56) References Cited

U.S. PATENT DOCUMENTS

| 11,290,223 | B1 * | 3/2022 | Zhang | ................... H04L 1/0008 |
| 12,058,230 | B2 * | 8/2024 | Han | ........................ H04L 69/18 |

| 2016/0227437 | A1 * | 8/2016 | Blanksby | .................. H04L 1/00 |
| 2016/0365942 | A1 * | 12/2016 | Sun | ........................ H04L 5/0007 |
| 2021/0337564 | A1 * | 10/2021 | Kwon | ............... H04W 72/0446 |
| 2021/0360472 | A1 * | 11/2021 | Cao | ..................... H04L 27/2605 |

FOREIGN PATENT DOCUMENTS

| CN | 101330346 A | * | 12/2008 | |
| EP | 3 817 492 A1 | | 5/2021 | |
| WO | WO-2022160311 A1 | * | 8/2022 | ............ H04W 28/10 |

OTHER PUBLICATIONS

Ronny Yongho Kim et al., IEEE 802.11-22/1052r0, End time alignment of Sync PPDUs medium access—CID 12415, 12426, 12431, Jul. 10, 2022, p. 1-7, XP068192610 ,Jul. 10, 2022.

* cited by examiner

*Primary Examiner* — Jamie J Atala
(74) *Attorney, Agent, or Firm* — Winston Hsu

(57) ABSTRACT

The present invention provides a control method of a wireless communication module, wherein the control method includes the steps of: receiving target end time information of a PPDU, and estimating a symbol count of the PPDU according to the target end time information; determining a duration of a packet extension of the PPDU; refining at least one of a padding factor, the duration of packet extension, and the symbol count of the PPDU, wherein the padding factor indicates invalid data information of the PPDU; generating an alignment setting comprising a final symbol count of the PPDU, the duration of packet extension, and the padding factor of the PPDU; and aggregating a plurality of MPDUs to generate the PPDU according to the alignment setting.

6 Claims, 7 Drawing Sheets

CONTROL METHOD OF WIRELESS COMMUNICATION MODULE FOR PPDU END TIME ALIGNMENT

CROSS REFERENCE TO RELATED APPLICATIONS

This application claims the benefit of U.S. Provisional Application No. 63/383,110, filed on Nov. 10, 2022. The content of the application is incorporated herein by reference.

BACKGROUND

IEEE 802.11be defines multiple link operations that allow an access point (AP) and a station to communicate with each other by using two or more links. Due to a hardware limitation such as the capability of radio frequency (RF) filters between RF bands within the station, the AP/station can be operated in a synchronous mode or an asynchronous mode. The synchronous mode is also named as a non-simultaneous transmit and receive (NSTR) mode, that is the AP/station cannot transmit and receive data at the same time via multiple links. The asynchronous mode is also named as a simultaneous transmit and receive (STR) mode, that is the AP/station can transmit and receive data at the same time via multiple links, but the AP/station does not need to transmit data by using the multiple links simultaneously.

Regarding the NSTR mode, IEEE 802.11be also defines physical layer protocol data unit (PPDU) end time alignment requirements, that is when multiple PPDUs are simultaneously transmitted via multiple links, respectively, their end times should be aligned, and all differences between each pair of multiple links between the end times of the simultaneously transmitted PPDUs is required to be less than or equal to a specific time, to avoid the interference between pairs of multiple links. However, because the given length (in time as a unit) of a PPDU to be transmitted may not be the same as the actual transmission time of the PPDU, the multiple PPDUs may not be accurately aligned.

SUMMARY

It is therefore an objective of the present invention to provide a wireless communication method, which can determine a suitable symbol count and a duration of packet extension (PE) within a PPDU for the PPDU end time alignment mechanism, to solve the above-mentioned problems.

According to one embodiment of the present invention, a control method of a wireless communication module comprises the steps of: receiving target end time information of a PPDU, and estimating a symbol count of the PPDU according to the target end time information; determining a duration of a packet extension of the PPDU; refining an alignment setting comprising at least one of a padding factor, the duration of the packet extension, and the symbol count of the PPDU, wherein the padding factor indicates invalid data information of the PPDU; generating the alignment setting comprising a final symbol count of the PPDU, the duration of the packet extension, and the padding factor of the PPDU; and aggregating a plurality of media access control protocol data units (MPDUs) to generate the PPDU according to the alignment setting.

According to one embodiment of the present invention, a circuitry of a wireless communication module is configured to perform the steps of: receiving target end time information of a PPDU, and estimating a symbol count of the PPDU according to the target end time information; determining a duration of a packet extension of the PPDU; refining an alignment setting comprising at least one of a padding factor, the duration of the packet extension, and the symbol count of the PPDU, wherein the padding factor indicates invalid data information of the PPDU; generating the alignment setting comprising a final symbol count of the PPDU, the duration of the packet extension, and the padding factor of the PPDU; and aggregating a plurality of MPDUs to generate the PPDU according to the alignment setting.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
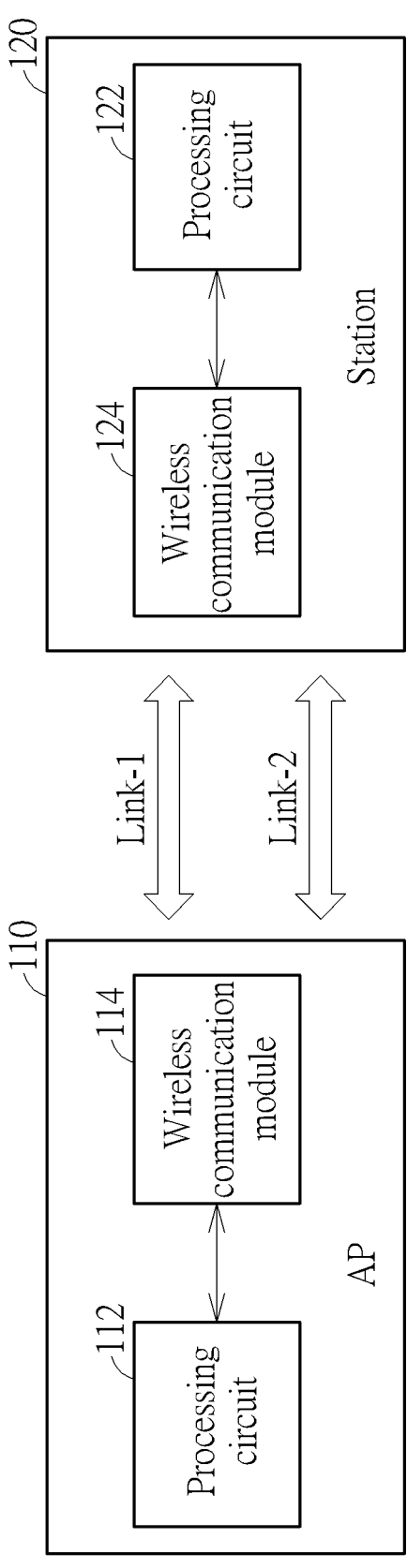
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an access point (AP) 110 and at least one station such as 120. The AP 110 is a Wi-Fi access point that allows other wireless devices such as the station 120 to connect to a wired network, and the AP 110 mainly comprises a processing circuit 112 and a wireless communication module 114. The station 120 is a Wi-Fi station comprising a processing circuit 122 and a wireless communication module 124, and the station 120 can be a cell phone, a tablet, a notebook, or any other electronic device capable of wirelessly communicating with the AP 110. In addition, the wireless communication module 114/124 comprises at least a media address control (MAC) layer circuitry and physical layer circuitry.

In this embodiment, the AP 110 and the station 120 are multi-link devices (MLD), that is the AP 110 and the station 120 are communicated with each other by using two or more links such as Link-1 and Link-2 shown in FIG. 1. In this embodiment, the Link-1 may use a channel corresponding to a 2.4 GHz band (e.g., 2.412 GHz-2.484 GHz), a 5 GHz band (e.g., 4.915 GHz-5.825 GHz) or a 6 GHz band (e.g., 5.925 GHz-7.125 GHz); and the Link-2 may also use a channel corresponding to the 2.4 GHz band, the 5 GHz band or the 6 GHz band.

In this embodiment, the AP 110 and the station 120 operate in the NSTR mode, that is the AP 110 cannot transmit and receive data at the same time via multiple links. As described in the background of the present invention, IEEE 802.11be defines PPDU end time alignment requirements, that is when multiple PPDUs are simultaneously transmitted via multiple links, respectively, their end times should be aligned with a specific tolerance requirement. Therefore, the following embodiments provide control methods that can generate the PPDU with suitable length.

Figure 2:
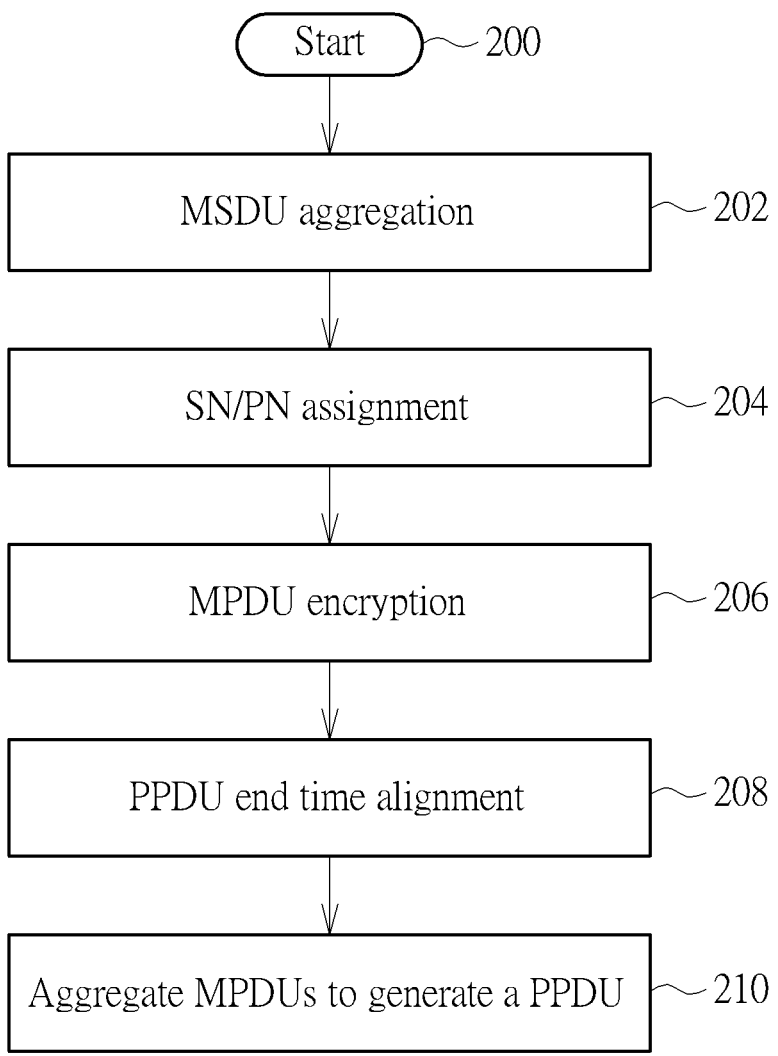
FIG. 2 is a control method of one wireless communication module according to one embodiment of the present invention.

FIG. 2 is a control method of one of the wireless communication modules 114 and 124 according to one embodiment of the present invention. In the following description, the wireless communication module 114 serves as an example to perform the following steps, but the present invention is not limited thereto. In Step 200, the flow starts, and the AP 110 and the station 120 have established two or more links. In Step 202, the wireless communication module 114 obtains a plurality of MAC service data units (MSDUs), and the wireless communication module 114 aggregates the MSDUs to generate MPDUs, wherein one MPDU may comprise one or more MSDUs. In Step 204, the wireless communication module 114 performs sequence number (SN) and packet number (PN) assignment for each MPDU. In Step 206, an encryption operation is performed on the MPDUs. In Step 208, a MAC layer circuit within the wireless communication module 114 performs a PPDU end time alignment operation to determine a symbol count and related setting of the PPDU. In Step 208, the MAC layer circuit within the wireless communication module 114 aggregates a plurality of MPDUs to generate a PPDU, and the PPDU is transmitted to the station 120 via a physical layer circuit of the wireless communication module 114. It is noted that Steps 202-206 and Step 210 are known by a person skilled in the art, and the present invention focuses on the PPDU end time alignment operation of Step 208, so the detailed operations of Steps 202-206 and Step 210 are omitted here.

Figure 3:
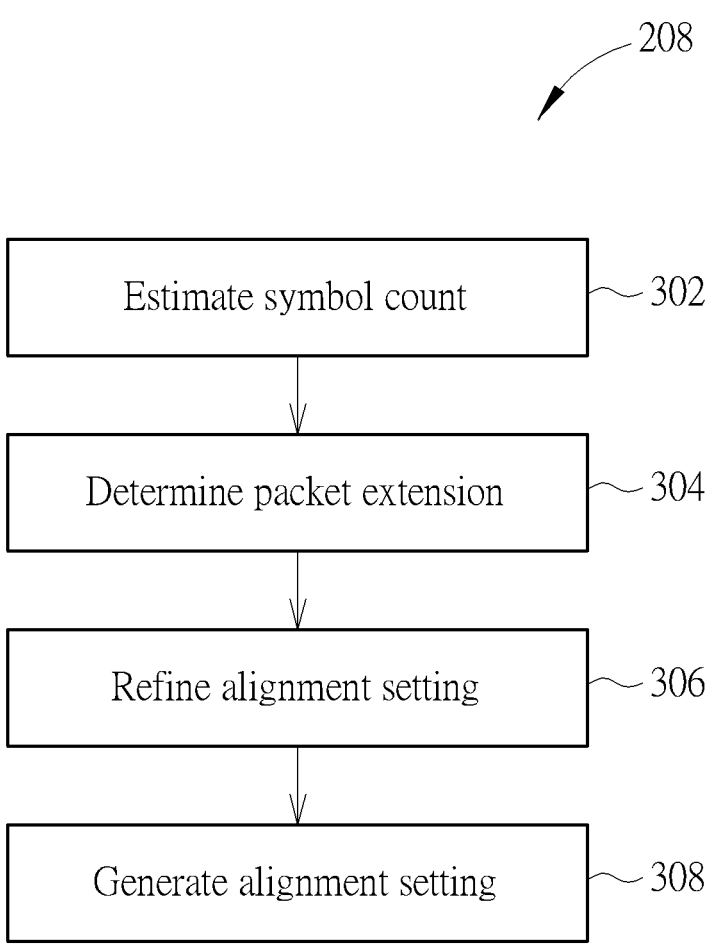
FIG. 3 shows a flowchart of the PPDU end time alignment operation according to one embodiment of the present invention.

FIG. 3 shows a flowchart of the PPDU end time alignment operation according to one embodiment of the present invention. In Step 302, the MAC layer circuit of the wireless communication module 114 receives target end time information of the PPDU, and estimates a symbol count of the PPDU according to the target end time information, wherein the symbol count of the PPDU may comprise data symbol count in the physical layer service data unit (PSDU) and/or SIG/LTF (Signal/Long Training Field) symbol in the preamble. In one embodiment, the target end time information comprises a target length of a PPDU, and this information can be derived based on multi-link operation (MLO) or dual band dual concurrent (DBDC) links, or "TXVECTOR" parameter defined in IEEE 802.11 specification. It is noted that the determination of target end time information or the target length of PPDU is known by a person skilled in the art, further descriptions are omitted here. In this embodiment, the symbol count of the PPDU can be estimated by the target length of a PPDU, a length of each symbol (orthogonal frequency division multiplexing (OFDM) symbol), a length of a preamble of the PPDU and other parameter(s) such as packet extension disambiguity information. For example, without a limitation of the present invention, the data symbol count of the PPDU can be estimated by the following formula:

$$N_{SYM} = \left\lceil \frac{\frac{L\_LENGTH + 3}{3} * 4 - T_{EHT-PREAMBLE}}{T_{SYM}} \right\rceil - b_{PE-Disambiguiy} \tag{1}$$

In the formula (1), "$N_{sym}$" is the data symbol count of the PPDU, "L_LENGTH" is the target length of a PPDU, "$T_{sym}$" is the length of each data symbol, "$T_{EHT-PREAMBLE}$" is length of a preamble, "b PE-Disambiguity" is the packet extension disambiguity information, and "[ ]" is a truncation operator. It is noted that the formula (1) is provided in the IEEE 802.11be specification, so a person skilled in the art should understand the operation corresponding to this formula.

In Step 304, the MAC layer circuit determines a length of a packet extension (PE) according to the symbol count of the PPDU, the target length of the PPDU, a length of each symbol and a length of a preamble of the PPDU. For example, without a limitation of the present invention, the duration of the PE ($T_{pE}$) can be estimated by the following formula:

$$T_{PE} = \left\lceil \frac{\frac{L\_LENGTH + 3}{3} * 4 - T_{EHT-PREAMBLE} - N_{SYM} * T_{SYM}}{4} \right\rceil \tag{2}$$

It is noted that the formula (2) is provided in the IEEE 802.11be specification, so a person skilled in the art should understand the operation corresponding to this formula.

The duration of the PE calculated in Step 304 is used for a nominal packet padding requested by the receiver (e.g., the station 120) defined in IEEE 802.11 specification, for the receiver to have additional processing time to decode the received symbols. It is noted that $T_{PE}$ calculated in Step 304 may not enough for the nominal packet padding requirement.

The duration of the packet extension ($T_{pE}$) obtained in Step 304 is for the mode supporting a packet padding by PE mechanism, such as High Efficiency (HE) defined in IEEE 8002.11ax and Extreme High Throughput (EHT) modes defined in IEEE 802.11be. If the operation mode of the wireless communication module 114 does not support the packet padding by PE mechanism (e.g., Very High Throughput (VTH)), the duration of the packet extension can be directly set to zero.

In Step 306, the MAC layer circuit refines an alignment setting based on an alignment mechanism, wherein the alignment mechanism may be a force-extra-symbol(-segment) mechanism, an avoid-extra-symbol mechanism or a best-effort mechanism; and the alignment setting comprises at least one of a padding factor, a duration of packet extension and a final symbol count of the PPDU.

Figure 4:
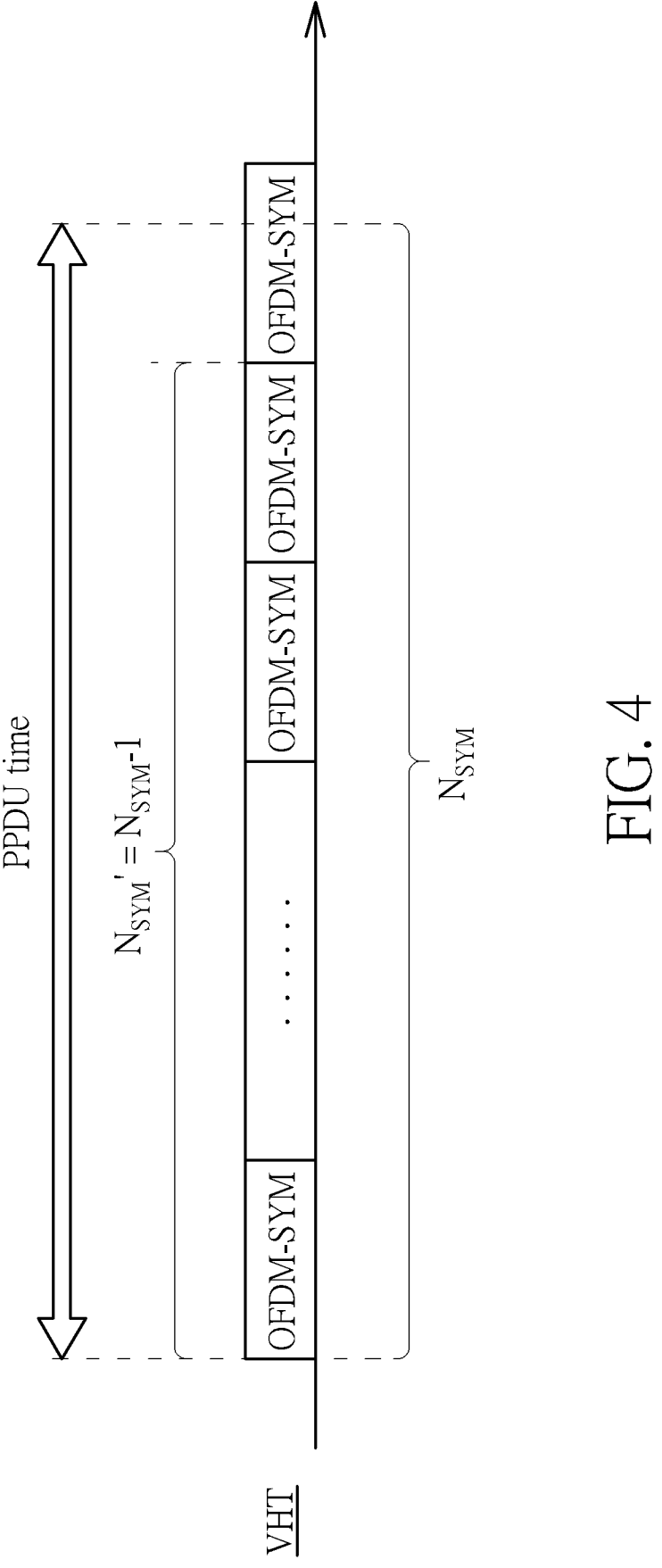
FIG. 4 shows a force-extra-symbol(-segment) mechanism according to one embodiment of the present invention.

Regarding the force-extra-symbol(-segment) mechanism, the MAC layer directly subtracts one symbol or one symbol segment from "$N_{syM}$" calculated by formula (1) to obtain an alignment setting. In one embodiment, referring to FIG. 4, the wireless communication module 114 does not have the mode of packet padding by PE mechanism, and if the data symbol count of the PPDU calculated by using formula (1) is "$N_{syM}$", the MAC layer determines that the new data symbol count $N_{sym}'$ is equal to ($N_{sym}$-1). That is, when the PPDU is generated, the content contained more invalid data across all OFDM symbols.

In another embodiment, the wireless communication module 114 has the mode of packet padding by PE mechanism, and the MAC layer circuit intentionally reduce a pre-FEC (forward error correction) padding factor (hereinafter, a-factor) to make the PPDU has more invalid data. In the IEEE 802.11 specification, the pre-FEC padding factor has four different value, the last orthogonal frequency-division multiple access (OFDMA) symbol has four segments, and the pre-FEC padding factor having the value "1" indicates that only the first segment of the last OFDMA symbol has valid data, the pre-FEC padding factor having the value "2" indicates that only the first two segments of the last OFDMA symbol have valid data, the pre-FEC padding factor having the value "3" indicates that only the first three segments of the last OFDMA symbol have valid data, and the pre-FEC padding factor having the value "4" indicates that all the four segments of the last OFDMA symbol have valid data. In detail, referring to FIG. 5, assuming that the duration of PE (i.e., $T_{pE}$ shown in FIG. 5) calculated by formula (2) is 8 microseconds (us), and the nominal packet padding required by the receiver is 16 us, the last OFDMA symbol has four segments, a length of each segment is 4 us, the MAC layer circuit can initially determine that that the last OFDMA symbol has the a-factor equal to "2" so that only the first two segments of the last OFDMA symbol have valid data, and the last two segments only have invalid data, to make the length of the overall invalid data is equal to or greater than nominal packet padding (i.e., a summation of 8 us invalid symbol segment and 8 us packet extension is equal to 16 us nominal packet padding). Then, the MAC layer circuit adjusts the initial a-factor to be "1" to increase invalid data of a segment, and the final a-factor serves as the alignment setting that will be provided to the following module.

In the above force-extra-symbol(-segment) mechanism, by intentionally increase invalid data of one symbol or one symbol segment, the PPDU length (PPDU time) will not change much due to subsequent encoding operations. Specifically, if a low density parity check (LDPC) FEC is used in the subsequent encoding operations, the encoder may temporarily need to use one more symbol or symbol segment during the encoding process to improve the encoding quality, wherein this one more symbol or symbol segment is also called "LDPC extra symbol or symbol segment" in the IEEE 802.11 specification. At this time, the increased invalid data of one symbol or symbol segment can be used for this one more symbol or symbol segment, and the invalid data within the PPDU still satisfies nominal packet padding requirement (i.e., the a-factor becomes "2" from "1" in the encoding operations).

Figure 5:
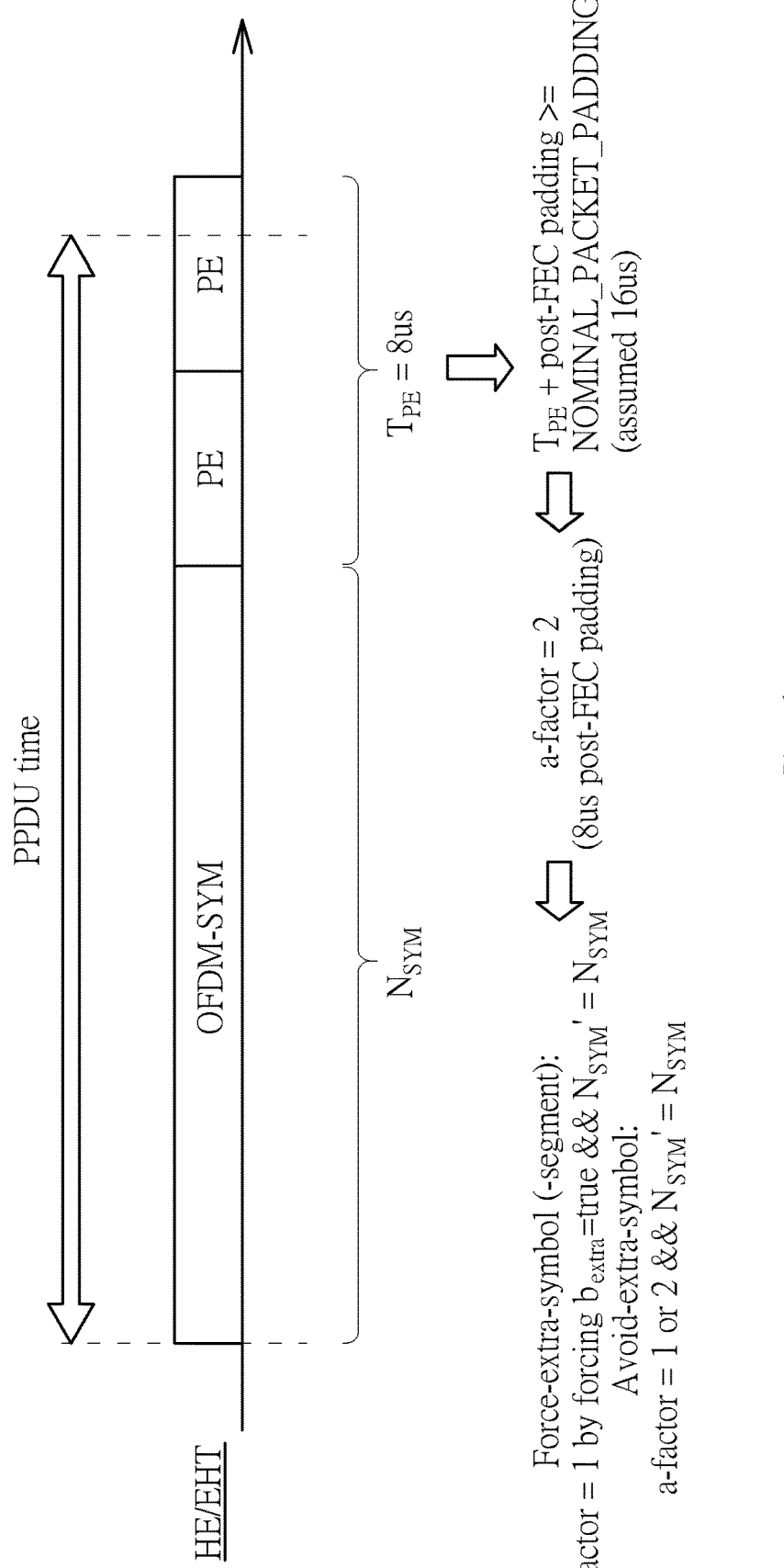
FIG. 5 shows a force-extra-symbol(-segment) mechanism according to one embodiment of the present invention.

In addition, in the force-extra-symbol(-segment) mechanism, "LDPC extra symbol" or "LDPC extra symbol segment" is always set to be true (e.g., the parameter "$b_{extra}$" shown in FIG. 5 is always set "1"), even if the encoder will not use one more symbol or symbol segment during the subsequent encoding process. Furthermore, the preamble of the PPDU generated later will always indicate the presence of the LDPC extra symbol or symbol segment.

Regarding the avoid-extra-symbol mechanism, the MAC layer circuit refers to the nominal packet padding requirement to determine the a-factor, and intentionally increase invalid data of one or more segment(s) to avoid introducing extra data symbol by the encoder. Taking FIG. 5 as an example, after the MAC layer circuit initially determines that the last OFDMA symbol has the a-factor equal to "1" or "2", which depends on the results of encoding process, to make the length of the overall invalid data is equal to or greater than nominal packet padding, this a-factor can directly serve as an alignment setting that will be provided to the following module. In one embodiment, if the encoder temporarily needs to use one more symbol or symbol segment during the encoding process to improve the encoding quality, the duration of packet extension may be increased to satisfy the nominal packet padding requirement.

Regarding the best-effort mechanism, the MAC layer circuit does not intentionally adjust the a-factor according to the nominal packet padding requirement, that is the a-factor is determined by using a look-up table defined in the IEEE 802.11 specification.

In Step 308, the alignment setting is provided to the following module for the encoding processing and MPDU aggregation. In this embodiment, the alignment setting comprises the symbol count and the a-factor mentioned above, and by using the symbol count and the a-factor, the byte count of one PPDU can be obtained for the MPDU aggregation.

Figure 6:
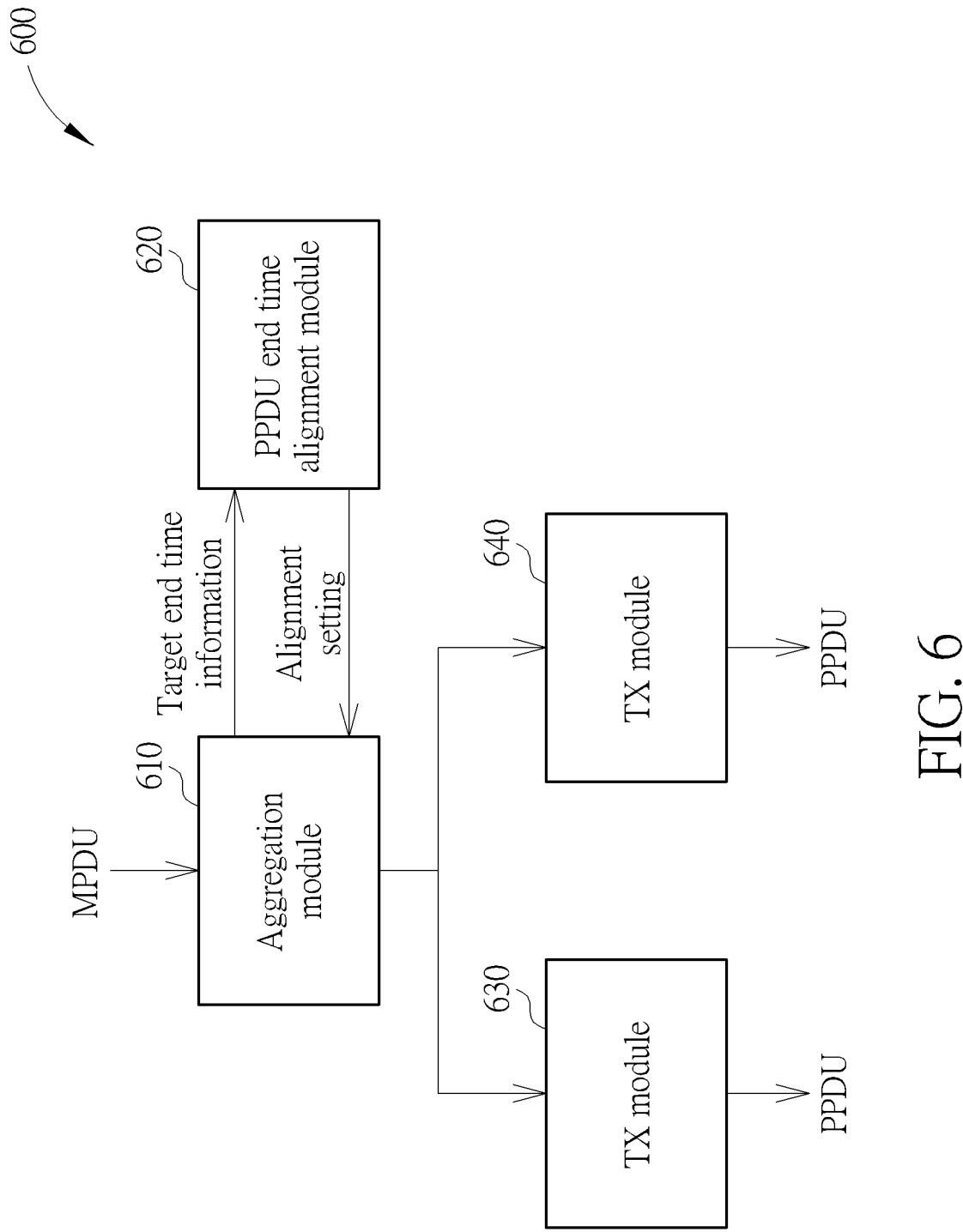
FIG. 6 is a diagram of a circuitry within the wireless communication module according to one embodiment of the present invention.

FIG. 6 is a diagram of a circuitry 600 within the wireless communication module 114 according to one embodiment of the present invention, wherein the circuitry 600 is configured to perform the Step 200-Step 210 and Step 302-Step 308. As shown in FIG. 6, the circuitry 600 comprises an aggregation module 610, a PPDU end time alignment module 620 and two transmission modules 630 and 640. The aggregation module 610 is configured to receive MPDUs corresponding to Link-1 and Link-2, and the aggregation module 610 transmits target end time information of two PPDUs respectively corresponding to Link-1 and Link-2 to the PPDU end time alignment module 620. Then, the PPDU end time alignment module 620 uses the above embodiments to generate the alignment settings to the aggregation module 610, for the byte count determination and MPDU aggregation. Then, the aggregation module 610 generates a first PPDU and a second PPDU, wherein the first PPDU is wirelessly transmitted by the transmission module 630 via Link-1, and the second PPDU is wirelessly transmitted by the transmission module 640 via Link-2.

Figure 7:
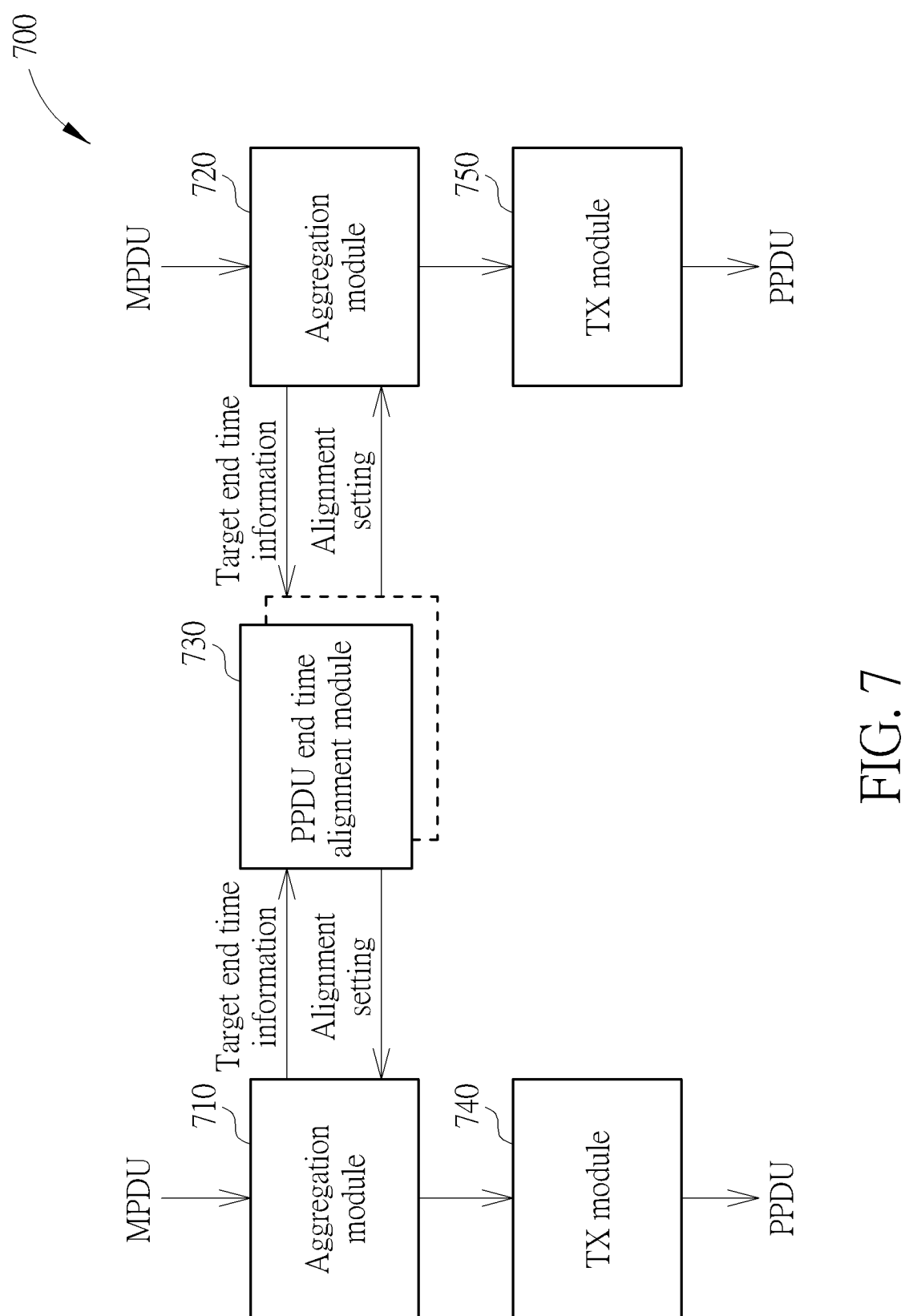
FIG. 7 is a diagram of a circuitry within the wireless communication module according to one embodiment of the present invention.

FIG. 7 is a diagram of a circuitry 700 within the wireless communication module 114 according to one embodiment of the present invention, wherein the circuitry 700 is configured to perform the Step 200-Step 210 and Step 302-Step 308. As shown in FIG. 7, the circuitry 700 comprises two aggregation modules 710 and 720, at least one PPDU end time alignment module 730 and two transmission modules 740 and 750, wherein the aggregation module 710 and the transmission module 740 correspond to Link-1, and the aggregation module 720 and the transmission module 750 correspond to Link-2. The aggregation module 710 is configured to receive MPDUs corresponding to Link-1, and the aggregation module 710 transmits target end time information of a PPDU to the PPDU end time alignment module 730. Then, the PPDU end time alignment module 730 uses the above embodiments to generate the alignment setting to the aggregation module 710, for the byte count determination and MPDU aggregation. Then, the aggregation module 710 generates a first PPDU, wherein the first PPDU is wirelessly transmitted by the transmission module 740 via Link-1. Similarly, the aggregation module 720 is configured to receive MPDUs corresponding to Link-2, and the aggregation module 720 transmits target end time information of a PPDU to the PPDU end time alignment module 730. Then, the PPDU end time alignment module 730 uses the above embodiments to generate the alignment setting to the aggregation module 720, for the byte count determination and MPDU aggregation. Then, the aggregation module 720 generates a second PPDU, wherein the second PPDU is wirelessly transmitted by the transmission module 750 via Link-2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a wireless communication module, comprising:

receiving target end time information of a physical layer protocol data unit (PPDU), and estimating a symbol count of the PPDU according to the target end time information;

determining a duration of a packet extension of the PPDU;

refining an alignment setting comprising at least one of a padding factor, the duration of the packet extension, and the symbol count of the PPDU, wherein the padding factor indicates invalid data information of the PPDU;

generating the alignment setting comprising a final symbol count of the PPDU and the padding factor of the PPDU; and aggregating a plurality of media access control protocol data units (MPDUs) to generate the PPDU according to the alignment setting;

wherein the control method further comprises:

subtracting one symbol from the symbol count of the PPDU to generate a new symbol count of the PPDU; and the step of generating the alignment setting comprises:

generating the alignment setting comprising the new symbol count of the PPDU.

2. A control method of a wireless communication module, comprising:

receiving target end time information of a physical layer protocol data unit (PPDU), and estimating a symbol count of the PPDU according to the target end time information;

determining a duration of a packet extension of the PPDU;

refining an alignment setting comprising at least one of a padding factor, the duration of the packet extension, and the symbol count of the PPDU, wherein the padding factor indicates invalid data information of the PPDU;

generating the alignment setting comprising a final symbol count of the PPDU and the padding factor of the PPDU; and aggregating a plurality of media access control protocol data units (MPDUs) to generate the PPDU according to the alignment setting;

wherein the step of refining the alignment setting of the PPDU comprises:

determining the padding factor, the duration of packet extension, and the final symbol count of the PPDU to satisfy a nominal packet padding requirement of a receiver and a target end time requirement;

directly adjusting the padding factor to make the PPDU have more invalid data; and the step of generating the alignment setting comprises:

generating the alignment setting comprising the final symbol count of the PPDU, a new duration of packet extension, and a new padding factor of the PPDU.

3. The control method of claim 2, wherein the padding factor is a pre-FEC (forward error correction) padding factor, the last symbol of a PPDU comprises a plurality of segments, and the step of directly adjusting the padding factor to make the PPDU have more invalid data comprises:

directly adjusting the padding factor to make a last symbol have at least one more segment(s) having invalid data.

4. A circuitry of a wireless communication module, comprising:

a physical layer protocol data unit (PPDU) end time alignment module, configured to perform steps of:

receiving target end time information of a physical layer protocol data unit (PPDU), and estimating a symbol count of the PPDU according to the target end time information;

determining a duration of a packet extension of the PPDU;

refining an alignment setting comprising at least one of a padding factor, the duration of the packet extension, and the symbol count of the PPDU, wherein the padding factor indicates invalid data information of the PPDU; and generating the alignment setting comprising a final symbol count of the PPDU and the padding factor of the PPDU; and an aggregation module, configured to perform steps of:

aggregating a plurality of media access control protocol data units (MPDUs) to generate the PPDU according to the alignment setting:

wherein the end time alignment module further subtracts one symbol from the symbol count of the PPDU to generate a new symbol count of the PPDU, and generates the alignment setting comprising the new symbol count of the PPDU.

5. A circuitry of a wireless communication module, comprising:

a physical layer protocol data unit (PPDU) end time alignment module, configured to perform steps of:

receiving target end time information of a physical layer protocol data unit (PPDU), and estimating a symbol count of the PPDU according to the target end time information;

determining a duration of a packet extension of the PPDU;

refining an alignment setting comprising at least one of a padding factor, the duration of the packet extension, and the symbol count of the PPDU, wherein the padding factor indicates invalid data information of the PPDU; and generating the alignment setting comprising a final symbol count of the PPDU and the padding factor of the PPDU; and an aggregation module, configured to perform steps of:

aggregating a plurality of media access control protocol data units (MPDUs) to generate the PPDU according to the alignment setting;

wherein the step of refining the alignment setting of the PPDU comprises:

determining the padding factor, the duration of packet extension, and the final symbol count of the PPDU to satisfy a nominal packet padding requirement of a receiver and a target end time requirement;

directly adjusting the padding factor to make the PPDU have more invalid data; and the step of generating the alignment setting comprises:

generating the alignment setting comprising the final symbol count of the PPDU, a new duration of packet extension, and a new padding factor of the PPDU.

6. The circuitry of claim 5, wherein the padding factor is a pre-FEC (forward error correction) padding factor, the last symbol of a PPDU comprises a plurality of segments, and the step of directly adjusting the padding factor to make the PPDU have more invalid data comprises:

directly adjusting the padding factor to make a last symbol have at least one more segment(s) having invalid data.

* * * * *